(12) United States Patent
Yokoyama et al.

(10) Patent No.: US 12,724,416 B2
(45) Date of Patent: Sep. 1, 2026

(54) CONTROL DEVICE

(71) Applicant: TOYOTA JIDOSHA KABUSHIKI KAISHA, Toyota (JP)

(72) Inventors: Daiki Yokoyama, Miyoshi (JP); Jyunya Katou, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 43 days.

(21) Appl. No.: 18/888,166

(22) Filed: Sep. 18, 2024

(65) Prior Publication Data

US 2025/0155891 A1 May 15, 2025

(30) Foreign Application Priority Data

Nov. 14, 2023 (JP) ................................ 2023-193650

(51) Int. Cl.
*G05D 1/225* (2024.01)
*B62D 65/18* (2006.01)

(52) U.S. Cl.
CPC ............ *G05D 1/225* (2024.01); *B62D 65/18* (2013.01)

(58) Field of Classification Search
CPC .............. G05D 1/225; G05D 2101/20; G05D 2105/45; G05D 2107/70; G05D 2109/10; G05D 2111/10; G05D 1/249; B62D 65/18; G05B 19/418
See application file for complete search history.

(56) References Cited

U.S. PATENT DOCUMENTS

2017/0320529 A1 11/2017 Nordbruch
2021/0232989 A1* 7/2021 Rana ...................... B25J 9/1694
2022/0382262 A1* 12/2022 Arthur ............. G05B 19/41875
2023/0145508 A1* 5/2023 Kaphengst ....... G05B 19/41805 701/24

FOREIGN PATENT DOCUMENTS

JP 2017-538619 A 12/2017

* cited by examiner

*Primary Examiner* — Anne Marie Antonucci
*Assistant Examiner* — Luis G Del Valle
(74) *Attorney, Agent, or Firm* — SoraIP, Inc.

(57) ABSTRACT

A control device for remotely controlling a vehicle in a factory where a plurality of processes are performed for manufacturing a vehicle includes: a determination unit that determines whether or not a component is correctly assembled to the vehicle; and a computing unit that, when the component is correctly assembled to the vehicle, acquires at least one of a position and an orientation of the vehicle using a first method based on detection data acquired by an external sensor, and, when the component is not correctly assembled to the vehicle, obtains at least one of a position and an orientation using a second method different from the first method based on the detection data.

3 Claims, 6 Drawing Sheets

FIG. 3

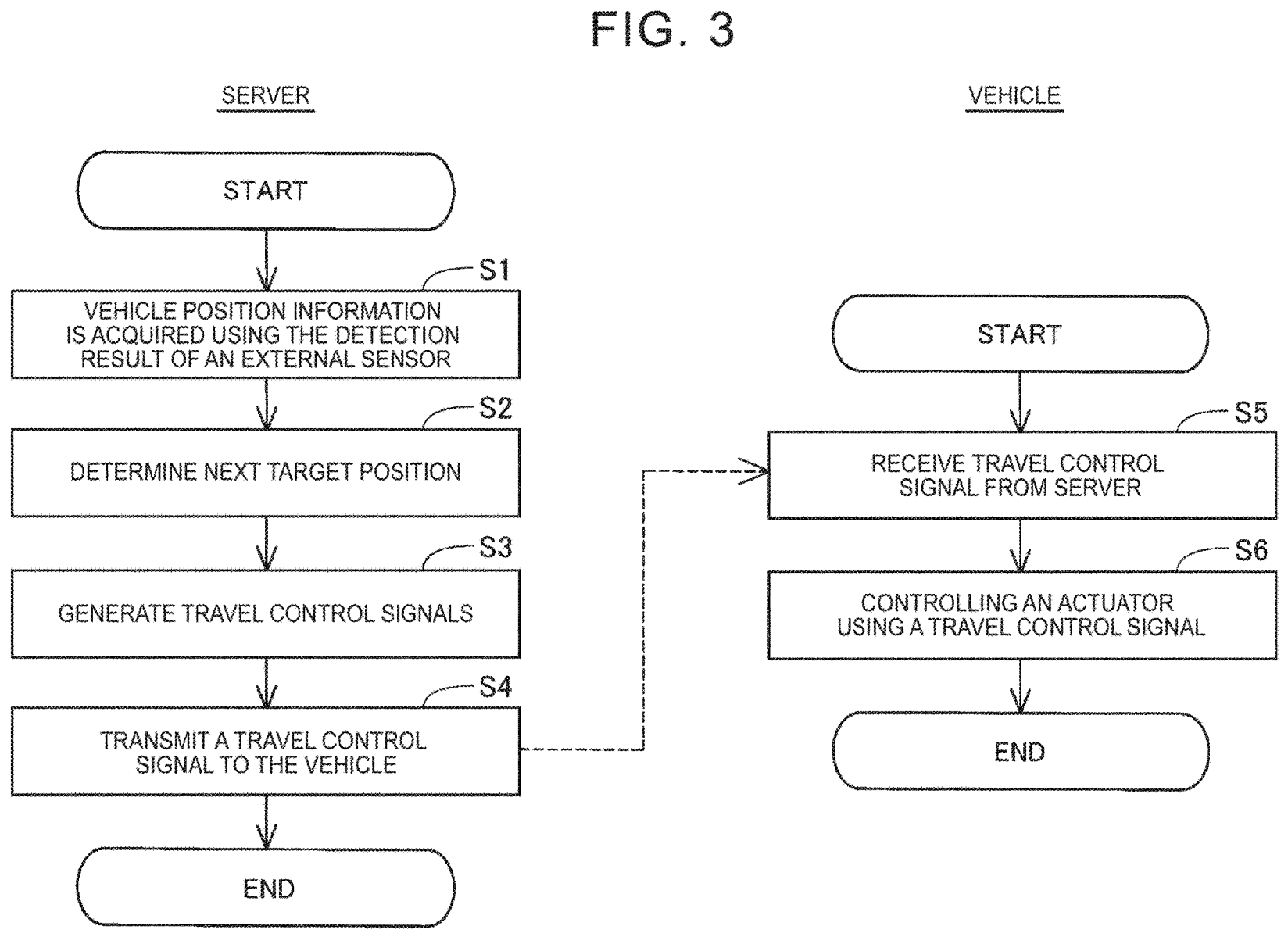

SERVER

START

S1 VEHICLE POSITION INFORMATION IS ACQUIRED USING THE DETECTION RESULT OF AN EXTERNAL SENSOR

S2 DETERMINE NEXT TARGET POSITION

S3 GENERATE TRAVEL CONTROL SIGNALS

S4 TRANSMIT A TRAVEL CONTROL SIGNAL TO THE VEHICLE

END

VEHICLE

START

S5 RECEIVE TRAVEL CONTROL SIGNAL FROM SERVER

S6 CONTROLLING AN ACTUATOR USING A TRAVEL CONTROL SIGNAL

END

CONTROL DEVICE

CROSS-REFERENCE TO RELATED APPLICATION

This application claims priority to Japanese Patent Application No. 2023-193650 filed on Nov. 14, 2023, incorporated herein by reference in its entirety.

BACKGROUND

1. Technical Field

The present disclosure relates to a control device.

2. Description of Related Art

Japanese Unexamined Patent Application Publication (Translation of PCT application) No. 2017-538619 (JP 2017-538619 A) describes a vehicle that is an object of manufacturing and that also travels by remote control, in a manufacturing process for manufacturing the vehicle.

SUMMARY

In order to remotely control traveling of the vehicle, it is necessary to detect a position and an orientation of the vehicle. Accordingly, the position and the orientation of the vehicle may be detected based on an external shape of the vehicle. In this case, there has been demand for technology that is capable of suppressing decrease in detection accuracy of the position and the orientation of the vehicle, even if there is defective assembly of a component to be assembled to the vehicle.

The present disclosure can be realized in the following aspects.

(1) According to a first aspect of the present disclosure, a control device is provided.

This control device is a control device that remotely controls a vehicle traveling in a factory in which a plurality of processes is performed for manufacturing a vehicle, the vehicle being an object of the processes, the control device including a determination unit that determines whether a component is correctly assembled to the vehicle, and a computing unit that, when the component is correctly assembled to the vehicle, acquire at least one of a position and an orientation of the vehicle, using a first method, based on detection data acquired by an external sensor, and when the component is not correctly assembled to the vehicle, find at least one of the position and the orientation, using a second method that differs from the first method, based on the detection data.

According to this aspect, a different method is used to compute at least one of the position and the orientation of the vehicle in a case in which there is no defective assembly of the component and in a case in which there is defective assembly of the component. Accordingly, even if there is defective assembly of a component to be assembled to the vehicle, decrease in the detection accuracy of the position and the orientation of the vehicle can be suppressed.

(2) In the control device according to the above aspect, the first method may be a method of finding at least one of the position and the orientation, using a first machine learning model generated by machine learning using a training dataset containing an image taken of the vehicle in which the component is correctly assembled, based on an image of the vehicle as the detection data acquired by a camera serving as the external sensor, and the second method may be a method of finding at least one of the position and the orientation, using a second machine learning model generated by machine learning using a training dataset containing an image taken of the vehicle in which the component is not correctly assembled, based on the image of the vehicle as the detection data.

According to this aspect, a different machine learning model is used to compute at least one of the position and the orientation of the vehicle using the image of the vehicle acquired by the camera serving as the external sensor, in a case in which there is no defective assembly of the component and a in case in which there is defective assembly of the component. Accordingly, even if there is defective assembly of a component to be assembled to the vehicle, decrease in the detection accuracy of the position and the orientation of the vehicle can be suppressed.

(3) In the control device according to the above aspect, the first method may be a method of finding at least one of the position and the orientation, using a third machine learning model generated by machine learning using a training dataset containing an image taken of the vehicle in a state following an object process being implemented, based on an image of the vehicle as the detection data acquired by a camera serving as the external sensor, and the second method may be a method of finding at least one of the position and the orientation, using a fourth machine learning model generated by machine learning using a training dataset containing an image taken of the vehicle in a state prior to the object process being implemented, based on the image of the vehicle as the detection data.

According to this aspect, a different machine learning model is used to compute at least one of the position and the orientation of the vehicle using the image of the vehicle acquired by the camera serving as the external sensor, in a case in which there is no defective assembly of the component and a in case in which there is defective assembly of the component. Accordingly, even if there is defective assembly of a component to be assembled to the vehicle, decrease in the detection accuracy of the position and the orientation of the vehicle can be suppressed.

(4) In the control device according to the above aspect, the first method may be a method of finding at least one of the position and the orientation, using ranging point data as the detection data acquired by a ranging device serving as the external sensor, and first reference data that is three-dimensional computer-aided design data representing a shape of the vehicle in which the component is correctly assembled, and the second method may be a method of finding at least one of the position and the orientation, using the ranging point data as the detection data, and second reference data that is three-dimensional computer-aided design data representing a shape of the vehicle in which the component is not correctly assembled.

According to this aspect, a different method is used to compute the position and the orientation of the vehicle by using the ranging point data acquired by the ranging device serving as an external sensor, in a case in which there is no defective assembly of the component and a case in which there is defective assembly of the component. Accordingly, even if there is defective assembly of a component to be assembled to the vehicle, decrease in the detection accuracy of the position and the orientation of the vehicle can be suppressed.

(5) In the control device according to the above aspect, the first method may be a method of finding at least one of the position and the orientation, using ranging point data as the detection data acquired by a ranging device serving as the external sensor, and third reference data that is three-dimensional computer-aided design data representing a shape of the vehicle in a state following an object process being implemented, and the second method may be a method of finding at least one of the position and the orientation, using the ranging point data as the detection data, and fourth reference data that is three-dimensional computer-aided design data representing a shape of the vehicle in a state prior to the object process being implemented.

According to this aspect, a different method is used to compute the position and the orientation of the vehicle by using the ranging point data acquired by the ranging device serving as an external sensor, in a case in which there is no defective assembly of the component and a case in which there is defective assembly of the component. Accordingly, even if there is defective assembly of a component to be assembled to the vehicle, decrease in the detection accuracy of the position and the orientation of the vehicle can be suppressed.

Note that the present disclosure can be realized in various forms, and can be realized, for example, in the form of a remote operation system, a mobile body control device, a remote automated driving method, a manufacturing method of a mobile body, and the like.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart illustrating a processing procedure of travel control of the vehicle according to the embodiment;

DETAILED DESCRIPTION OF EMBODIMENTS

A. Embodiment

Figure 1:
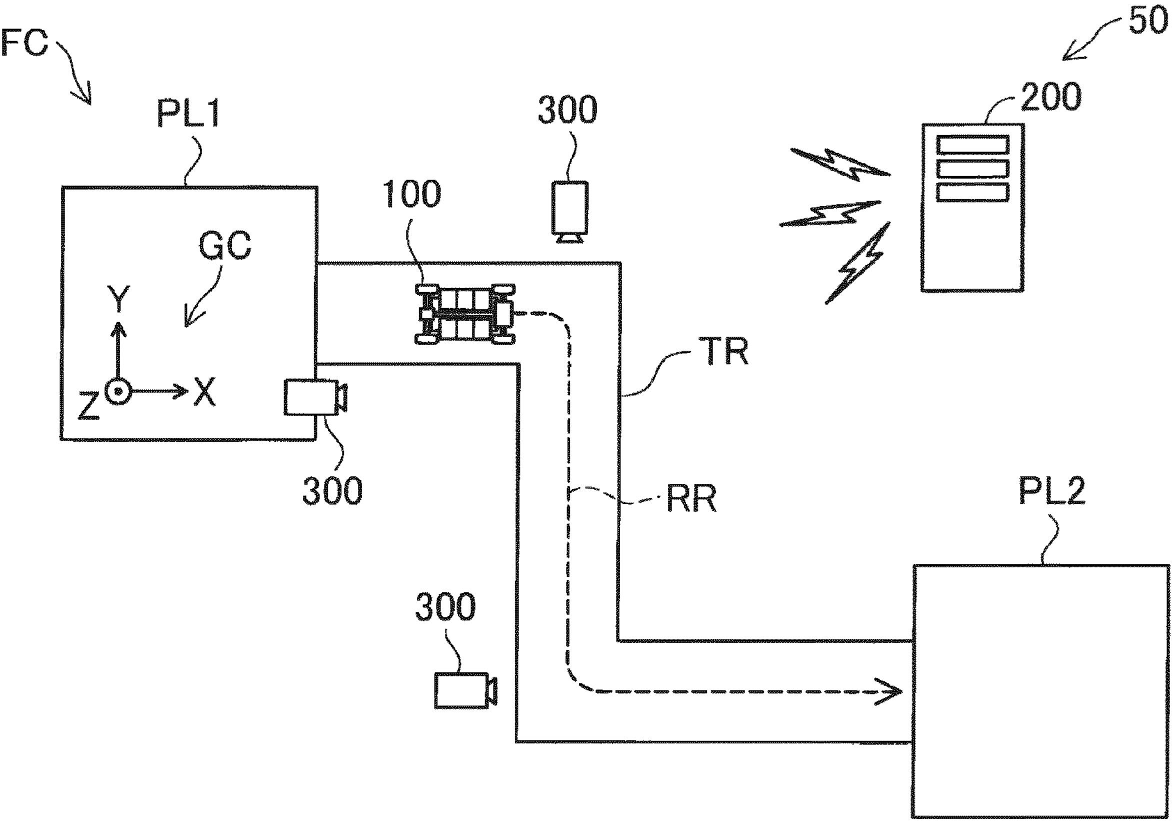
FIG. 1 is a conceptual diagram illustrating a configuration of a system according to an embodiment.

A1. Remote Control System Configuration:

FIG. 1 is a conceptual diagram illustrating a configuration of a system 50 according to an embodiment. The system 50 is used in a factory FC for manufacturing the vehicles 100. Vehicle 100 is battery electric vehicle (BEV). The system 50 includes one or more vehicles 100 as a moving object, a server 200, and a plurality of external sensors 300. The server 200 is also referred to as a "control device". The external sensor 300 is a camera that captures an image of the vehicle 100. In the present disclosure, "moving object" means a movable object, and is, for example, a vehicle or an electric vertical takeoff and landing machine (a so-called flying vehicle). The vehicle may be a vehicle traveling by a wheel or a vehicle traveling by an infinite track, and is, for example, a passenger car, a truck, a bus, a two-wheeled vehicle, a four-wheeled vehicle, a tank, a construction vehicle, or the like. Vehicles include battery electric vehicle (BEV), gasoline-powered vehicles, hybrid electric vehicle, and fuel cell electric vehicle. When the moving body is other than the vehicle, the expressions of "vehicle" and "vehicle" in the present disclosure can be appropriately replaced with "moving body", and the expression of "traveling" can be appropriately replaced with "moving".

The vehicle 100 can travel by unmanned driving. The term "unmanned driving" means driving that does not depend on the traveling operation of the passenger. The traveling operation means an operation related to at least one of "running", "turning", and "stopping" of the vehicle 100. The unmanned driving is realized by automatic or manual remote control using a device positioned outside the vehicle 100 or by autonomous control of the vehicle 100. A passenger who does not perform the traveling operation may be on the vehicle 100 traveling by the unmanned driving. The passenger who does not perform the traveling operation includes, for example, a person who is simply seated on the seat of the vehicle 100 and a person who performs a work different from the traveling operation such as an assembling operation, an inspection operation, and an operation of switches while riding on the vehicle 100. Driving by the traveling operation of the occupant is sometimes referred to as "manned driving".

Vehicle 100 is being manufactured and travels in a factory FC where vehicle 100 is manufactured by unmanned driving. The reference coordinate system of the factory FC is a global coordinate system GC. That is, any position in the factory FC is represented by the coordinates of X, Y, Z in the global coordinate system GC. The factory FC includes a first location PL1 and a second location PL2. The first location PL1 and the second location PL2 are connected by a track TR on which the vehicles 100 can travel. In the factory FC, a plurality of external sensors 300 are installed along the track TR. The positions of the external sensors 300 in the factory FC are adjusted in advance. The vehicles 100 travel through the track TR from the first location PL1 to the second location PL2 by unmanned driving.

The first location PL1 is a location where an operation of assembling the vehicles 100 is performed. For example, in the first location PL1, an assembling operation of a component is performed by an assembling robotic device (not shown). The vehicles 100 assembled at the first location PL1 are in a state in which they can travel by unmanned driving, in other words, in a state in which they can perform three functions of "running", "turning", and "stopping" by unmanned driving. In the present embodiment, the vehicle 100 assembled at the first location PL1 travels from the first location PL1 to the second location PL2 by unmanned driving in the form of a platform with the configuration described below. Specifically, the vehicle 100 may include at least the vehicle control device 110 and the actuator group 120 in order to perform three functions of "running," "turning," and "stopping" by unmanned driving. When the vehicle 100 acquires information from the outside for unmanned driving, the vehicle 100 may further include a communication device 130. That is, the vehicle 100 that can be moved by the unmanned driving may not be equipped with at least a part of an interior component such as a driver's seat or a dashboard. In addition, at least a part of an exterior component such as a bumper or a fender may not be attached, and the body shell may not be attached. In this instance, the remaining components, such as the body shell, may be mounted to the vehicle 100 until the vehicle 100 is shipped from the factory FC. The remaining components, such as the body shell, may be mounted to the vehicle 100 after the vehicle 100 is shipped from the factory FC with the remaining components, such as the body shell, not being mounted to the vehicle 100. Each of the components may be mounted from any direction, such as the upper side, lower side, front side, rear side, right side or left side of the vehicle 100, each may be mounted from the same direction, or may be mounted from a different direction.

In the second location PL2, the components are further assembled to the vehicles 100 by an assembly robotic device (not shown).

Figure 2:
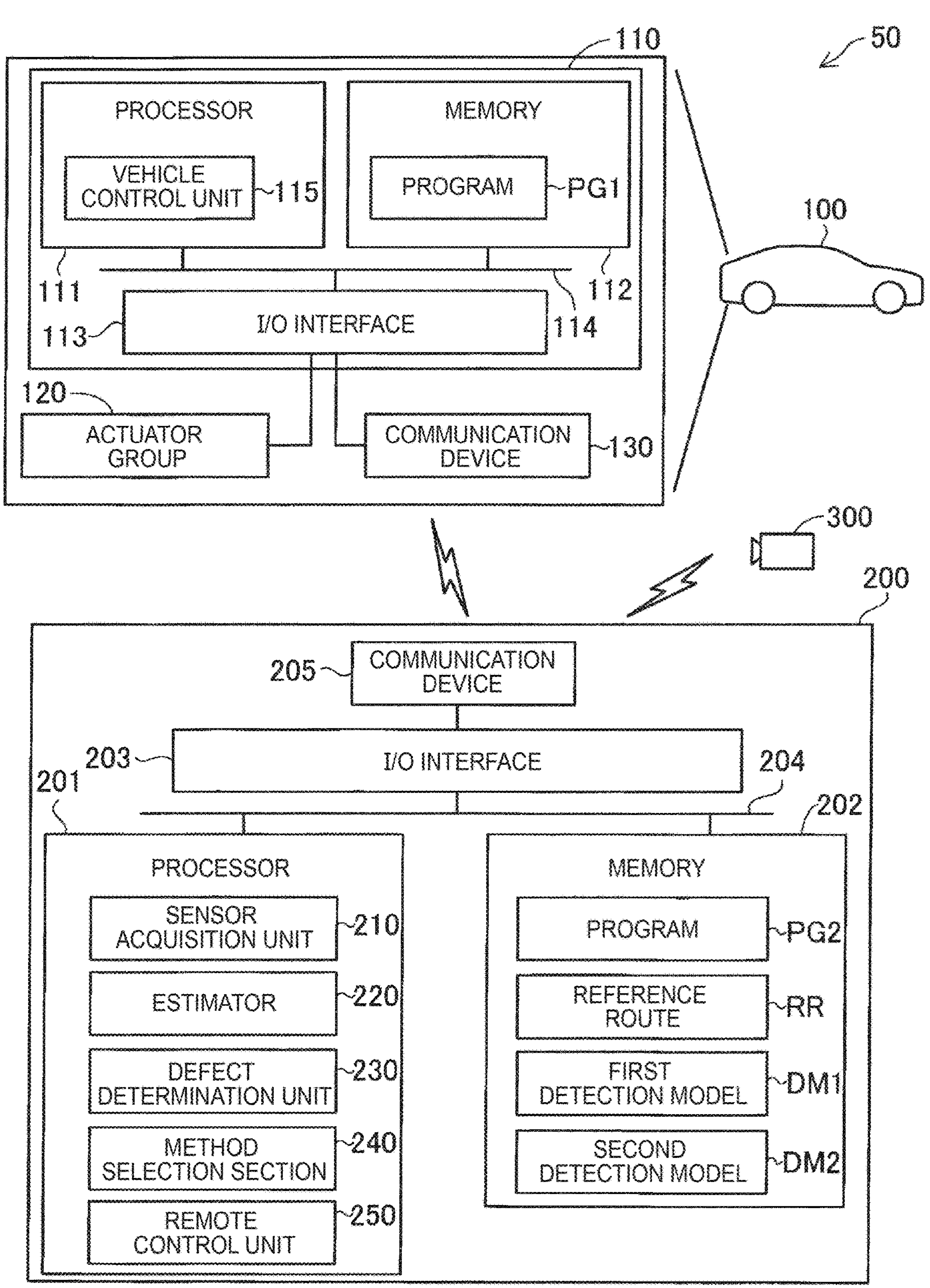
FIG. 2 is a block diagram illustrating a configuration of a system.

FIG. 2 is a block diagram illustrating a configuration of the system 50. The vehicle 100 includes a vehicle control device 110 for controlling each unit of the vehicle 100, an actuator group 120 including one or more actuators driven under the control of the vehicle control device 110, and a communication device 130 for wirelessly communicating with an external device such as the server 200. The actuator group 120 includes an actuator of a driving device for accelerating the vehicle 100, an actuator of a steering device for changing a traveling direction of the vehicle 100, and an actuator of a braking device for decelerating the vehicle 100.

The vehicle control device 110 includes a computer including a processor 111, a memory 112, an input/output interface 113, and an internal bus 114. The processor 111, the memory 112, and the input/output interface 113 are bidirectionally communicably connected via an internal bus 114. An actuator group 120 and a communication device 130 are connected to the input/output interface 113. The processor 111 executes the program PG1 stored in the memory 112 to realize various functions including functions as the vehicle control unit 115.

The vehicle control unit 115 can cause the vehicle 100 to travel by controlling the actuator group 120 using the travel control signal received from the server 200. The travel control signal is a control signal for causing the vehicle 100 to travel. In the present embodiment, the travel control signal includes the acceleration and the steering angle of the vehicle 100 as parameters. Alternatively, the travel control signal may include the speed of the vehicle 100 as a parameter in place of or in addition to the acceleration of the vehicle 100.

The server 200 includes a computer including a processor 201, a memory 202, an input/output interface 203, and an internal bus 204. The processor 201, the memory 202, and the input/output interface 203 are bidirectionally communicably connected via an internal bus 204. A communication device 205 for communicating with various devices external to the server 200 is connected to the input/output interface 203. The communication device 205 can communicate with the vehicle 100 by wireless communication, and can communicate with each external sensor 300 by wired communication or wireless communication.

In the memory 202, a program PG2, a first detection model DM1 and a second detection model DM2 to be described later, a reference route RR indicating a route on which the vehicle 100 should travel, and the like are stored in advance. The processor 201 executes the program PG2 stored in the memory 202 to realize various functions including functions as the sensor acquisition unit 210, the estimation unit 220, the defect determination unit 230, the method selection unit 240, and the remote control unit 250.

The sensor acquisition unit 210 acquires a detection result output from an external sensor 300 described later. In the present embodiment, the sensor acquisition unit 210 acquires a captured image of the vehicle 100 captured by the camera that is the external sensor 300. The captured image is also referred to as "detection data". The estimation unit 220 estimates the position and the orientation of the vehicle 100 using the detection result output from the external sensor 300. Alternatively, the estimation unit 220 may estimate only one of the position and the orientation of the vehicle 100 using the detection result output from the external sensor 300. In this case, for example, the other of the position and the orientation of the vehicle 100 is determined using the travel history of the vehicle 100 or the like. The defect determination unit 230 determines whether or not there is a defective assembly of a component to the vehicle 100. The defect determination unit 230 is also referred to as a "determination unit". The method selection unit 240 selects a method for estimating the position and the orientation of the vehicle 100 according to whether or not there is a defective assembly of a component to the vehicle 100. The estimation unit 220 and the method selection unit 240 are also referred to as "computing units".

The remote control unit 250 acquires a detection result by the sensor, and generates a travel control signal for controlling the actuator group 120 of the vehicle 100 using the detection result. The remote control unit 250 transmits a travel control signal to the vehicle 100 to cause the vehicle 100 to travel by remote control. The remote control unit 250 may generate and output not only a travel control signal but also a control signal for controlling various accessories provided in the vehicle 100 and actuators for operating various kinds of equipment such as a wiper, a power window, and a lamp. That is, the remote control unit 250 may operate the various types of equipment and the various accessories by remote control. Herein, "remote control" includes "full remote control" in which all of the operations of the vehicle 100 are completely determined from the outside of the vehicle 100, and "partial remote control" in which a part of the operations of the vehicle 100 is determined from the outside of the vehicle 100.

The external sensor 300 is a sensor positioned outside the vehicle 100. The external sensor 300 is a sensor that captures the vehicle 100 from the outside of the vehicle 100. The external sensor 300 includes a communication device (not shown), and can communicate with another device such as the server 200 by wired communication or wireless communication. Specifically, the external sensor 300 is configured by a camera installed in a site of the factory FC. The camera as the external sensor 300 captures a captured image including the vehicle 100, and outputs the captured image as a detection result.

FIG. 3 is a flowchart illustrating a processing procedure of travel control of the vehicle 100. The process of FIG. 3 is executed by the processor 201 of the server 200 functioning as the remote control unit 250 and the processor 111 of the vehicle 100 functioning as the vehicle control unit 115. For example, the process illustrated in FIG. 3 is repeatedly executed at predetermined time intervals from the time when the vehicle 100 starts traveling by remote control.

In S1, the processor 201 of the server 200 acquires the vehicle position information of the vehicle 100 using the detection result outputted from the external sensor 300. The vehicle position information is position information that is a basis for generating a travel control signal. In the present embodiment, the vehicle position information includes the position and orientation of the vehicle 100 in the global coordinate system GC of the factory FC. Specifically, in S1, the processor 201 acquires the vehicle position information using the detection result acquired by the external sensor 300, that is, the captured image acquired by the camera. Details of a method of detecting the position and the orientation of the vehicle 100 will be described later.

In S2, the processor 201 of the server 200 determines the target position to which the vehicles 100 should be heading next. In the present embodiment, the target position is represented by the coordinates of X, Y, Z in the global coordinate system GC. In the memories 202 of the server 200, reference route RR that is a route on which the vehicles 100 should travel is stored in advance. The route is represented by a node indicating a starting point, a node indicating a passing point, a node indicating a destination, and a link connecting the respective nodes. The processor 201 uses the vehicle position information and the reference route RR to determine the target position to which the vehicle 100 is to be directed next. The processor 201 determines the target position on the reference route RR ahead of the current position of the vehicles 100.

In S3, the processor 201 of the server 200 generates a travel control signal for causing the vehicle 100 to travel toward the determined target position. The processor 201 calculates the traveling speed of the vehicle 100 from the transition of the position of the vehicle 100, and compares the calculated traveling speed with the target speed. The processor 201 generally determines the acceleration so that the vehicle 100 accelerates when the travel speed is lower than the target speed, and determines the acceleration so that the vehicle 100 decelerates when the travel speed is higher than the target speed. Further, when the vehicle 100 is positioned on the reference route RR, the processor 201 determines the steering angle and the acceleration so that the vehicle 100 does not deviate from the reference route RR. When the vehicle 100 is not positioned on the reference route RR, in other words, when the vehicle 100 deviates from the reference route RR, the processor 201 determines the steering angle and the acceleration so that the vehicle 100 returns to the reference route RR.

In S4, the processor 201 of the server 200 transmits the generated travel control signal to the vehicles 100. The processor 201 repeats the acquisition of the position of the vehicle 100, the determination of the target position, the generation of the travel control signal, the transmission of the travel control signal, and the like at predetermined intervals.

In S5, the processor 111 of the vehicle 100 receives the travel control signal transmitted from the server 200. In S6, the processor 111 of the vehicle 100 controls the actuator group 120 using the received travel control signal, thereby causing the vehicle 100 to travel at the acceleration and the steering angle represented by the travel control signal. The processor 111 repeatedly receives the travel control signal and controls the actuator group 120 at a predetermined cycle. According to the system 50 of the present embodiment, the vehicle 100 can be driven by remote control, and the vehicle 100 can be moved without using a conveyance facility such as a crane or a conveyor.

Figure 4:
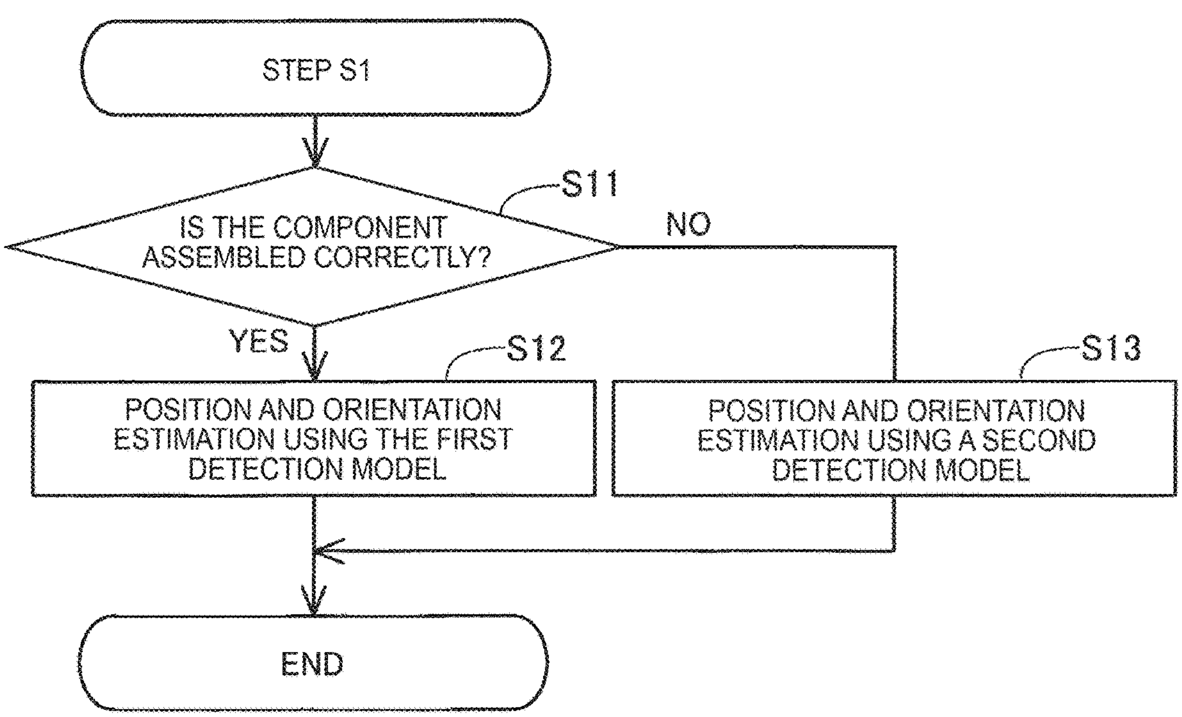
FIG. 4 is a flow chart showing a detailed process of S1 in FIG. 3.

FIG. 4 is a flow chart showing a specific process of S1 in FIG. 3. The processing illustrated in FIG. 4 is executed by the processor 201 of the server 200 functioning as the sensor acquisition unit 210, the estimation unit 220, the defect determination unit 230, and the method selection unit 240. In the present embodiment, when there is an assembly failure of a component to be assembled to the vehicle 100, a method of calculating the position and the orientation of the vehicle 100 is changed.

In S11, using the images of the vehicle 100 acquired by the external sensor 300, it is determined whether or not the components to be attached in the target process are correctly assembled to the vehicle 100. The target step is, for example, a step performed immediately before. In order to facilitate understanding of the technology, in the present specification, it is assumed that a process prior to the target process is correctly performed. For example, when the process performed immediately before is a process P2 and the process prior to the process P2 is a process P1, the vehicle 100 to be subjected to the process P2 is a vehicle in which components are correctly attached in the process P1. For example, the vehicles 100 that are defective in assembling the components in the process P1 are taken out of the line prior to performing the process P2.

For example, by a pattern matching method using a reference image prepared in advance, it is determined whether or not a component is correctly assembled according to whether or not the captured image and the reference image are similar to each other. As an image for reference prepared in advance, for example, an image obtained by the external sensor 300 capturing the vehicle 100 in which the components are correctly assembled in the process performed immediately before can be used. The reference image and the captured image are acquired by the same external sensor 300, for example. When the degree of similarity between the captured image and the reference image is equal to or greater than a predetermined threshold value, it is determined that the component is correctly assembled.

Further, for example, it may be determined whether or not a component is correctly assembled by a pattern matching method using a plurality of captured images acquired by the same external sensor 300 in a predetermined period. The plurality of captured images acquired in a predetermined period may be a plurality of captured images acquired continuously in time series. When the determination result that the component is not correctly assembled is obtained based on a predetermined number of captured images among the plurality of captured images, it may be determined that the component is not correctly assembled.

Further, for example, it may be determined whether or not the components are correctly assembled by a pattern matching method using a plurality of captured images acquired by a plurality of external sensors 300 at the same timing. When the determination result that the component is not correctly assembled is obtained based on a predetermined number of captured images among the plurality of captured images, it may be determined that the component is not correctly assembled.

When the components are correctly assembled to the vehicles 100 (S11; YES), S12 process is executed. When the components are not correctly assembled to the vehicles 100 (S11; NO), S13 process is executed.

In S12, the position of the vehicles 100 is estimated using the first detection model DM1. A method of estimating the position of the vehicles 100 using the first detection model DM1 is also referred to as a "first method". The first detection model DM1 is also referred to as a "first machine learning model". To be more specific, first, the captured images are inputted into the first detection model DM1 using artificial intelligence, so that the appearance-shape of the vehicles 100 is detected. The first detection model DM1 may be, for example, a learned machine learning model learned to implement either semantic segmentation or instance segmentation. As the machine learning model, for example, a convolutional neural network (hereinafter, CNN) learned by supervised learning using a training dataset can be used. The training dataset DS1 is used to generate the first detection model DM1. The training dataset DS1 includes a plurality of training images including the vehicle 100 in which the components are correctly assembled in the process performed immediately before, and labels indicating which of the regions in the training images is the region indicating the vehicle 100 and the region indicating the regions other than the vehicle 100. When learning, the parameters are preferably updated by back propagation so as to reduce the error between the output and the labeling by the first detection model DM1. Further, the coordinates in the image coordinate system representing the appearance-shape detected using the first detection model DM1 are transformed into the coordinates in the global coordinate system GC. In this way, the position of the vehicles 100 in the global coordinate system GC is acquired.

Further, for example, the orientation of the vehicle 100 is estimated based on the orientation of the vector related to the motion of the vehicle 100 calculated using the optical flow method. In the optical flow method, the orientation of the vector with respect to the motion of the vehicle 100 is estimated from the position change of the feature point of the moving object between frames of the captured image.

In S13, the position and orientation of the vehicles 100 are estimated using the second detection model DM2. A method of estimating the position of the vehicles 100 using the second detection model DM2 is also referred to as a "second method". The second detection model DM2 is also referred to as a "second machine learning model". To be more specific, first, the photographed images are inputted into the second detection model DM2 using artificial intelligence to detect the appearance-shape of the vehicles 100. The difference from the process in S12 is that the second detection model DM2 is used as a machine learning model for detecting the appearance-shape of the vehicles 100.

The training dataset DS2 is used to generate the second detection model DM2. The training dataset DS2 includes a plurality of training images including the vehicle 100 in which the components are not correctly assembled in the process performed immediately before, and labels indicating which of the regions in the training images is the region indicating the vehicle 100 and the region indicating the regions other than the vehicle 100. Failure to assemble a component includes that the component is not attached to the vehicle 100 at all, that the component is assembled to the vehicle 100, but that the assembled position is an incorrect position. Further, the component assembly failure includes that the component is not sufficiently fixed to the vehicle 100, and that the component is rattled. In the case where a plurality of components is assembled in the immediately preceding process, the fact that the components are not assembled correctly includes the fact that one or more components are not attached in the correct position.

Various aspects are envisioned as aspects in which the components are not properly assembled. Therefore, for example, a plurality of machine learning models may be included in the second detection model DM2, each of which is generated by classifying a component assembly defect that may occur in a target process into a typical pattern and using a training set including training images corresponding to the respective patterns.

Further, the coordinates in the image coordinate system representing the appearance-shape detected using the second detection model DM2 are transformed into the coordinates in the global coordinate system GC. In this way, the position of the vehicles 100 in the global coordinate system GC is acquired. The estimation of the orientation of the vehicles 100 is the same as that of S12. The above is the process related to the position and estimation in S1 shown in FIG. 3.

According to the present embodiment, a different method is used for determining the position of the vehicle in a case where there is no assembly failure of the component and a case where there is an assembly failure of the component. Therefore, even if there is a defective assembly of a component to be assembled to the vehicle 100, it is possible to suppress a decrease in the detection accuracy of the position of the vehicle 100.

B. Other Embodiments

B1

The machine learning model used in the case where there is no component assembly failure and in the case where there is component assembly failure is not limited to the one described in the above embodiment.

When there is no defective assembly of the components, the processor 201 may determine the position of the vehicle 100 using the third detection model DM3 based on the images of the vehicle as the detection data acquired by the camera as the external sensor 300. The third detection model DM3 is generated by machine learning using a learning dataset including images of vehicles taken after the subject process is performed.

The training dataset DS3 is used in generating the third detection model DM3. The training dataset DS3 includes a plurality of training images including the vehicle 100 in a condition after the target process is performed, and labels indicating which of the regions in the training images is a region indicating the vehicle 100 and a region indicating a region other than the vehicle 100. In a case where the target process is a process performed immediately before, the plurality of training images including the vehicle 100 in a state after the target process is performed become a plurality of training images including the vehicle 100 in which the component is correctly assembled in the process performed immediately before as in the embodiment.

In addition, when there is a component assembly failure, the processor 201 may determine the position of the vehicle 100 using the fourth detection model DM4 based on images of the vehicle as detection data. The fourth detection model DM4 is generated by machine learning using a learning dataset including images of vehicles in a condition prior to a process of interest being performed.

The training dataset DS4 is used in generating the fourth detection model DM4. The training dataset DS4 includes a plurality of training images including the vehicle 100 in a condition prior to the subject process being performed, and labels indicating which of the regions in the training images is a region indicating the vehicle 100 and a region indicating other than the vehicle 100. In a case where the target process is a process performed immediately before the target process, the plurality of training images including the vehicle 100 in a state before the target process is performed are, for example, a plurality of training images including the vehicle 100 in which the process immediately before the previous process is performed.

In another B1 embodiment, the method of estimating the position of the vehicles 100 using the third detection model DM3 is also referred to as a "first method". The third detection model DM3 is also referred to as a "third machine learning model". A method of estimating the position of the vehicles 100 using the fourth detection model DM4 is also referred to as a "second method". The fourth detection model DM4 is also referred to as a "fourth machine learning model". In this case, it is possible to save the time and effort for preparing the training image of the vehicle having the defective assembly of the components, and it is possible to easily prepare the training dataset.

B2

In addition, in a case where there is a component assembly failure, the processor 201 may determine the position of the vehicle 100 based on the image of the vehicle using two or more machine learning models. For example, suppose that two machine learning models are used. In this instance, the processor 201 may use the fourth detection model DM4 generated in the same manner as described in the above B1 as one of the two machine learning models.

Further, the processor 201 may determine the position of the vehicle 100 using the fifth detection model DM5 based on the images of the vehicle as the detection data as the other of the two machine learning models. The fifth detection model DM5 is generated by machine learning using a learning dataset including images obtained by photographing vehicles in a condition after a process of interest is performed.

The training dataset DS5 is used in generating the fifth detection model DM5. The training dataset DS5 includes a plurality of training images including the vehicle 100 in a condition in which the target process is performed, and labels indicating which of the regions in the training images is a region indicating the vehicle 100 and a region indicating a region other than the vehicle 100. When the target process is a process performed immediately before, the plurality of training images including the vehicles 100 after the target process is performed are the same as the training images included in the training dataset DS3 of (D1). Therefore, as the fifth detection model DM5, the same as the third detection model DM3 generated as described in (D1) above can be used. As a result, it is possible to simplify the generation of the machine learning model.

If there is a component assembly failure, the processor 201 may adopt, as the final estimation result, the higher reliability of the estimation result among the position of the vehicle 100 estimated using the fourth detection model DM4 and the position of the vehicle 100 estimated using the fifth detection model DM5.

If there is no component assembly failure, the processor 201 may determine the position of the vehicle 100 using the third detection model DM3 in the same manner as in the above B1.

B3

In the above-described embodiment, the external sensor 300 is a camera, but the external sensor 300 may be a distance measuring device using the technique of light detection and ranging (LiDAR). In this case, the external sensor 300 acquires three-dimensional point cloud data of the vehicle 100. The three-dimensional point cloud data is data indicating the three-dimensional position of the point cloud. The three-dimensional point cloud data is also referred to as "detection data". The three-dimensional point group data is also referred to as "distance measurement point data".

In addition, different methods are used to estimate at least one of the position and the orientation of the vehicle 100 between a case where there is no component assembly failure and a case where there is a component assembly failure.

In the case where there is no component assembly failure, the processor 201 estimates at least one of the position and the orientation of the vehicle 100 by performing template matching. For the template matching, three-dimensional point cloud data as detected data acquired by a distance measuring device as the external sensor 300 and first vehicle point group data VP1 which is three-dimensional computer-aided design (CAD) data representing the shapes of the vehicles 100 in which the components are correctly assembled in the target process are used.

On the other hand, when there is a component assembly failure, the processor 201 estimates at least one of the position and the orientation of the vehicle 100 by performing template matching. As the template matching, three-dimensional point cloud data as detection data acquired by a distance measuring device as the external sensor 300 and second vehicle point group data VP2 as three-dimensional CAD data representing a shape of the vehicle 100 in which a component assembly failure has occurred in the target process are used. The first vehicle point group data VP1 and the second vehicle point group data VP2 are stored in advance in the memory 112. The first vehicle point group data VP1 and the second vehicle point group data VP2 may include information for specifying the orientation of the vehicle 100.

Further, in the target process, for example, when a plurality of components is assembled, a plurality of patterns exists in the assembly failure of the components. Therefore, as the second vehicle point group data VP2, a plurality of three-dimensional CAD data representing a plurality of assembly failure patterns may be prepared. For example, when three components are assembled in the target process, the second vehicle point group data VP2 may include three-dimensional CAD data representing a shape of the vehicle 100 in which only one component is assembled, and three-dimensional CAD data representing a shape of the vehicle 100 in which two components are assembled.

A method of estimating the position and orientation of the vehicle 100 using the first vehicle point group data VP1 is also referred to as a "first method". The first vehicle point group data VP1 is also referred to as "first reference data". A method of estimating the position and the orientation of the vehicle 100 using the second vehicle point group data VP2 is also referred to as a "second method". The second vehicle point group data VP2 is also referred to as "second reference data". In this specification, three-dimensional CAD data representing shapes of vehicles such as the first vehicle point group data VP1 used in template matching may be referred to as reference data.

B4

When the external sensor 300 is a ranging device using LiDAR techniques, the position and orientation of the vehicles 100 may be estimated as follows.

The processor 201 estimates at least one of the position and the orientation of the vehicle 100 by performing template matching when there is no component assembly failure. In the template matching, three-dimensional point cloud data as detected data acquired by a ranging device as the external sensor 300 and third vehicle point group data VP3 as three-dimensional CAD data representing the shape of the vehicle 100 after the target process is performed are used. The target step is, for example, a step performed immediately before. The third vehicle point group data VP3, which is the three-dimensional CAD data representing the shape of the vehicle 100 in a state after the target process is performed, may be the same as the first vehicle point group data VP1, which is the three-dimensional CAD data representing the shape of the vehicle 100 in which the component is correctly assembled in the target process described in the above B3.

On the other hand, the processor 201 estimates at least one of the position and the orientation of the vehicle 100 by performing template matching when there is a component assembly failure. In the template matching, three-dimensional point cloud data as detected data acquired by the ranging device as the external sensor 300 and fourth vehicle point group data VP4 which is three-dimensional CAD data representing the shape of the vehicle 100 in a state prior to the target process being performed are used. In the memory 112, the third vehicle point group data VP3 and the fourth vehicle point group data VP4 are stored in advance. The third vehicle point group data VP3 and the fourth vehicle point group data VP4 may include information for specifying the orientation of the vehicle 100.

A method of estimating the position and the orientation of the vehicle 100 using the third vehicle point group data VP3 is also referred to as a "first method". The third vehicle point group data VP3 is also referred to as "third reference data". A method of estimating the position and the orientation of the vehicle 100 using the fourth vehicle point group data VP4 is also referred to as a "second method". The fourth vehicle point group data VP4 is also referred to as "fourth reference data". In this case, it is possible to save the time and effort to prepare CAD of the vehicles having the defective assembly of the components.

Figure 5:
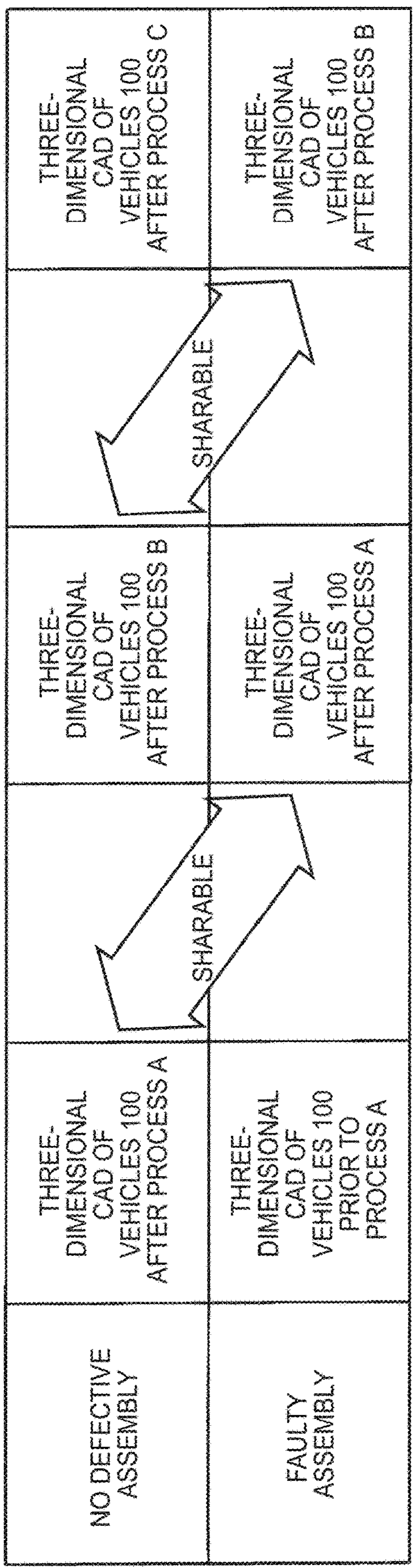
FIG. 5 is an illustration of the benefits of template matching using three-dimensional computer-aided design (CAD) data in another embodiment B4.

FIG. 5 is an explanatory diagram of an advantage of performing template matching using three-dimensional CAD data representing the shape of the vehicle 100 in a state where the target process is performed and three-dimensional CAD data representing the shape of the vehicle 100 in a state where the target process is not performed. For example, the steps A, B, and C are performed in this order, and the components are assembled to the vehicle 100 in each step. Further, it is assumed that there is no other step between step A and step B, and there is no other step between step B and step C.

In the step A, when there is no component assembly failure, three-dimensional CAD data representing the shapes of the vehicles 100 after the step A is performed is used as the reference data in the template matching.

In the step B, when there is a component assembly failure, three-dimensional CAD data representing the shapes of the vehicles 100 prior to the step B is used as the reference data. As shown, the three-dimensional CAD data representing the shape of the vehicle 100 prior to step B being performed is the same as the three-dimensional CAD data representing the shape of the vehicle 100 after step A is performed.

In the step C, when there is a component assembly failure, three-dimensional CAD data representing the shapes of the vehicles 100 prior to the step C is used as the reference data. As shown, the three-dimensional CAD data representing the shape of the vehicle 100 prior to step C being performed is the same as the three-dimensional CAD data representing the shape of the vehicle 100 after step B is performed.

As described above, the three-dimensional CAD data representing the shape of the vehicle 100 in the state after the target process is performed and the three-dimensional CAD data representing the shape of the vehicle 100 in the state prior to the target process being performed can be shared as the reference data. Therefore, the preparation of the three-dimensional CAD data, which is the reference data, can be simplified.

B5

In addition, in the case where there is a component assembly failure, the processor 201 may use two or more pieces of reference data in order to determine the position and orientation of the vehicle 100. For example, suppose that two pieces of reference data are used. In this instance, the processor 201 may use, as one of the two pieces of reference data, the fourth vehicle point group data VP4, which is three-dimensional CAD data representing the shape of the vehicle 100 in a state prior to the execution of the target process, as described in the above B4.

Further, the processor 201 may use, as the other of the two pieces of reference data, three-dimensional CAD data representing the shapes of the vehicles 100 after the process of interest has been performed. The three-dimensional CAD data is the same as the third vehicle point group data VP3 described in the above B4.

When there is a component assembly failure, the processor 201 can adopt, as the final estimation result, a higher degree of similarity with the reference data among the estimation result of the position and the orientation of the vehicle 100 estimated using the fourth vehicle point group data VP4 and the estimation result of the position and the orientation of the vehicle 100 estimated using the third vehicle point group data VP3.

In addition, when there is no component assembly failure, the processor 201 can estimate the position and orientation of the vehicles 100 in the same manner as in the above B4.

B6

In the embodiment, an example in which the position of the vehicle 100 is estimated using an image acquired by a camera that is the external sensor 300 has been described. Alternatively, a three-dimensional point cloud representing a three-dimensional space can be reproduced using a plurality of images acquired by a plurality of external sensors 300. The position and orientation of the vehicle 100 may be estimated by template matching using the reproduced data of the three-dimensional point cloud and the vehicle point group data prepared in advance. Here, the first vehicle point group data VP1, which is three-dimensional CAD data representing the shapes of the vehicles 100 in which the components are correctly assembled in the target process, is prepared in advance. In addition, a second vehicle point group data VP2 that is three-dimensional CAD data representing a shape of the vehicle 100 in which a component assembly failure has occurred in the target process is also prepared in advance. The first vehicle point group data VP1 and the second vehicle point group data VP2 include information for specifying the orientation of the vehicle 100.

Therefore, when the components are correctly assembled to the vehicle 100 in the target process, the position and the orientation of the vehicle 100 are estimated by performing template matching using the first vehicle point group data V1. On the other hand, when there is a component assembly failure in the target process, the position and the orientation of the vehicle 100 are estimated by performing template matching using the second vehicle point group data V2. Further, in the target process, for example, when a plurality of components is assembled, a plurality of patterns exists in the assembly failure of the components. Therefore, as the second vehicle point group data VP2, a plurality of three-dimensional CAD data representing a plurality of assembly failure patterns may be prepared.

Alternatively, as described in the above B4, when there is no defective assembly of the components, template matching is performed using three-dimensional CAD representing the shapes of the vehicles 100 after the target process is performed. In addition, when there is a component assembly failure, template matching is performed using three-dimensional CAD representing the shapes of the vehicles 100 prior to the target process being performed.

B7

In the embodiment, after determining whether or not there is a component assembly failure (see S11 of FIG. 4), if there is no component assembly failure, the position of the vehicle 100 is estimated using the first detection model DM1. On the other hand, when there is a component assembly failure, the position of the vehicle 100 is estimated using the second detection model DM2.

Alternatively, the position of the vehicle 100 may be estimated using the first detection model DM1 without determining the presence or absence of a component assembly failure. When the score indicating the reliability of the estimation result is less than a predetermined threshold, the position of the vehicle 100 is estimated using the second detection model DM2. This is because, when the reliability of the estimation result using the first detection model DM1 is less than the threshold value, it is assumed that the component is not correctly assembled in the immediately preceding process. On the other hand, when the reliability of the estimation result of the position of the vehicle 100 using the first detection model DM1 is equal to or greater than the threshold value, it is assumed that the components are correctly assembled in the immediately preceding process. In this case, the estimation process using the second detection model DM2 is not performed.

B8

In the embodiment, the determination of the presence or absence of a component assembly failure is performed using images (see S11 of FIG. 4). After each step is performed, for example, an operator may output the presence or absence of a component assembly failure to a higher-level server using a terminal device. In this case, the processor 201 can determine whether or not there is a component assembly failure by inquiring the host server about whether or not there is a component assembly failure in a process immediately before.

B9

Further, after estimating the position of the vehicle 100 in which the component assembly failure has occurred, the processor 201 of the server 200 can determine an evacuation area EA as the target position to which the vehicle 100 should be directed next using the vehicle position information. It is assumed that the memory 202 of the server 200 stores in advance the evacuation area EA that is an area in which the vehicle 100 is to be evacuated.

Figure 6:
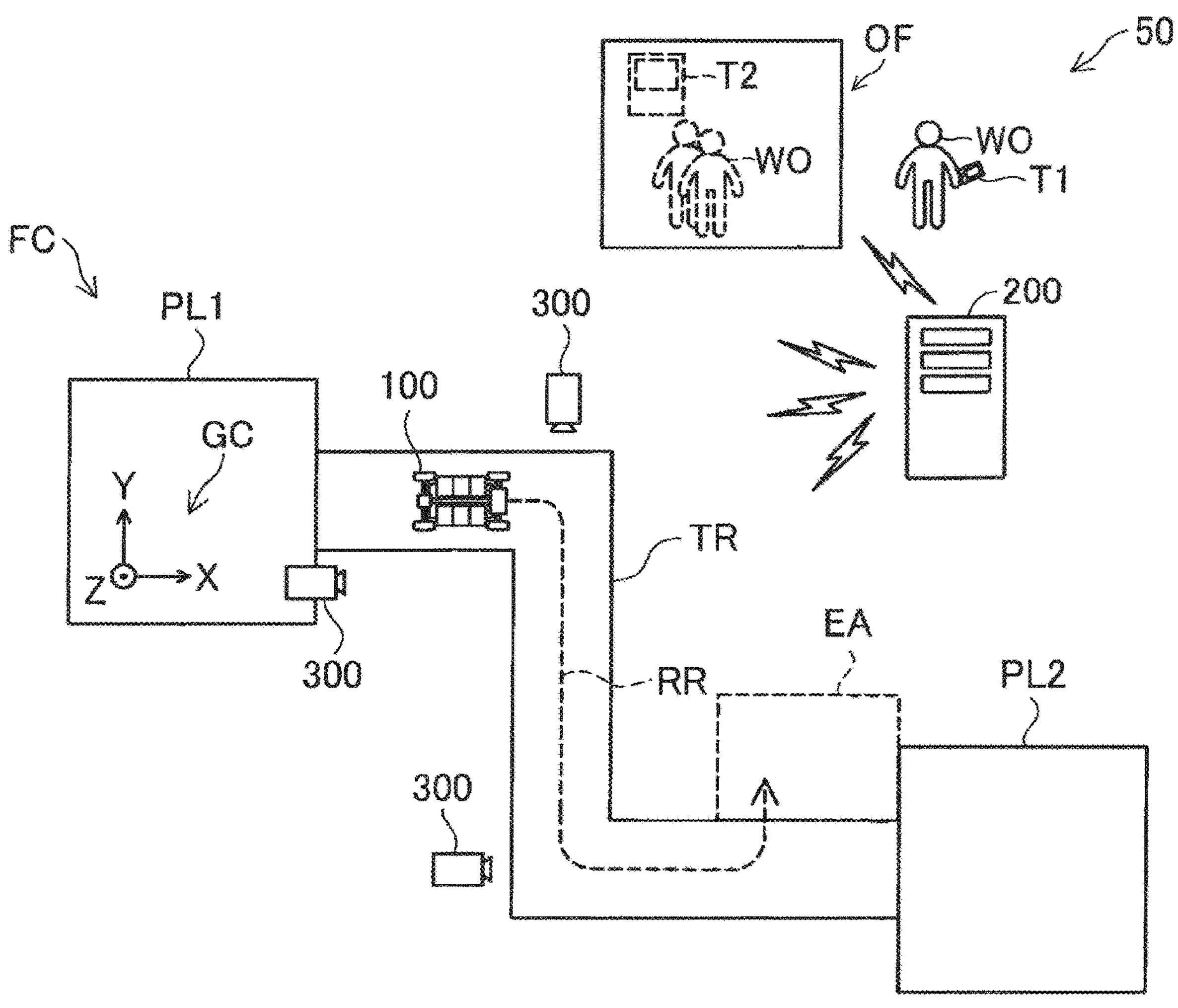
FIG. 6 is an explanatory diagram of a case where a vehicle is evacuated to an evacuation area.

FIG. 6 is an explanatory diagram of a situation where vehicles are evacuated to the evacuation area EA. The processor 201 generates a travel control signal for causing the vehicles 100 to travel toward the evacuation area EA which is the target position. Further, the processor 201 may notify the at least one worker WO of an instruction to collect the vehicle 100 together with the information for specifying the vehicle 100 prior to moving the vehicle 100 to the evacuation area EA or after moving the vehicle 100 to the evacuation area EA. For example, the processor 201 notifies the worker WO via the terminal device T1 included in the worker WO and the terminal device T2 installed in the standby place OF. The standby place OF is a place where the worker WO stands by or takes a rest. The at least one worker WO who has received the notification performs a recovery operation or the like of the vehicles 100 that have been evacuated to the evacuation area EA. With respect to the vehicle 100 in which the assembly failure of the component has occurred, it is possible to prevent the other vehicle 100 from traveling and to prevent the occurrence of a delay in a subsequent process or the like once coming out of the manufacturing line.

B10

In the above-described embodiment, the server 200 automatically generates a travel control signal to be transmitted to the vehicle 100. Alternatively, the server 200 may generate a travel control signal to be transmitted to the vehicle 100 in accordance with an operation of an external operator positioned outside the vehicle 100. For example, an external operator may operate a control device including a display for displaying a captured image output from the external sensor 300, a steering for remotely controlling the vehicle 100, an accelerator pedal, a brake pedal, and a communication device for communicating with the server 200 through wired communication or wireless communication. The server 200 may generate a travel control signal corresponding to an operation applied to the control device.

B11

The vehicle 100 may be manufactured by combining a plurality of modules. The module means a unit composed of a plurality of components arranged in accordance with a part or a function of the vehicle 100. For example, the platform of the vehicle 100 may be manufactured by combining a front module that constitutes a front portion of the platform, a central module that constitutes a central portion of the platform, and a rear module that constitutes a rear portion of the platform. The number of modules constituting the platform is not limited to three, and may be two or less or four or more. In addition to or instead of the components constituting the platform, the components constituting a part of the vehicle 100 different from the platform may be modularized. Further, the various modules may include any exterior components such as bumpers and grills, and any interior components such as sheets and consoles. In addition, not only the vehicle 100 but also a moving object of an arbitrary mode may be manufactured by combining a plurality of modules. Such a module may be manufactured, for example, by joining a plurality of components by welding, a fixture, or the like, or may be manufactured by integrally molding at least a part of the components constituting the module as one component by casting. Molding techniques for integrally molding one component, in particular a relatively large component, are also called gigacasting or megacasting. For example, the front module, the central module, and the rear module described above may be manufactured using gigacasting.

B12

Transporting the vehicle 100 by using the traveling of the vehicle 100 by the unmanned driving is also referred to as "self-propelled conveyance". A configuration for realizing self-propelled conveyance is also referred to as a "vehicle remote control autonomous traveling conveyance system". Further, a production method of producing the vehicle 100 by using self-propelled conveyance is also referred to as "self-propelled production". In self-propelled manufacturing, for example, at least a part of conveyance of the vehicle 100 is realized by self-propelled conveyance in a factory FC that manufactures the vehicle 100.

B13

Means for realizing the functions of the server 200 are not limited to software, and some or all of them may be realized by dedicated hardware. For example, circuitry represented by field programmable gate array (FPGA) or application specific integrated circuit (ASIC) may be used as dedicated hardware.

The present disclosure is not limited to each of the above embodiments, and can be realized by various configurations without departing from the spirit thereof. For example, the technical features in the embodiments corresponding to the technical features in the respective embodiments described in the summary column of the disclosure can be appropriately replaced or combined in order to solve the above-described problem or to achieve some or all of the above-described effects. In addition, if the technical features are not described as being essential in the present specification, they can be deleted as appropriate.

What is claimed is:

1. A control device that remotely controls a vehicle traveling in a factory in which a plurality of processes is performed for manufacturing a vehicle, the vehicle being an object of the processes, and the control device comprising:

a processor configured to:

acquire detection data output from an external sensor;

determine whether a component is correctly installed in the vehicle based on the acquired detection data; and calculate at least one of a position and an orientation of the vehicle with a first method or a second method based on a determination result of whether the component is correctly installed in the vehicle, wherein the processor:

in response to determining that the component is correctly installed in the vehicle, calculates at least one of the position and the orientation, using the first method; and in response to determining that the component is not correctly installed in the vehicle, calculates at least one of the position and the orientation, using the second method that differs from the first method, wherein:

the first method of calculating at least one of the position and the orientation uses ranging point data as the detection data acquired by a ranging device serving as the external sensor, and first reference data that is three-dimensional computer-aided design data representing a shape of the vehicle in which the component is correctly installed; and the second method of calculating at least one of the position and the orientation uses the ranging point data, and second reference data that is three-dimensional computer-aided design data representing a shape of the vehicle in which the component is not correctly installed.

2. A control device that remotely controls a vehicle traveling in a factory in which a plurality of processes is performed for manufacturing a vehicle, the vehicle being an object of the processes, and the control device comprising:

a processor configured to:

acquire detection data output from an external sensor;

determine whether a component is correctly installed in the vehicle based on the acquired detection data; and calculate at least one of a position and an orientation of the vehicle with a first method or a second method depending on whether the component is correctly installed in the vehicle, wherein the processor:

in response to determining that the component is correctly installed in the vehicle, calculates at least one of the position and the orientation, using the first method; and in response to determining that the component is not correctly installed in the vehicle, calculates at least one of the position and the orientation, using the second method that differs from the first method, wherein:

the first method of calculating at least one of the position and the orientation uses ranging point data as the detection data acquired by a ranging device serving as the external sensor, and third reference data that is three-dimensional computer-aided design data representing a shape of the vehicle in a state following an object process being implemented; and the second method of calculating at least one of the position and the orientation uses the ranging point data as the detection data, and fourth reference data that is three-dimensional computer-aided design data representing a shape of the vehicle in a state prior to the object process being implemented.

3. The control device according to claim 2, wherein:

the plurality of processes includes a first process and a second process;

the second process is performed immediately after the first process;

the determining of whether the component is correctly installed in vehicle, and the calculating of at least one of the position and the orientation of the vehicle with the first method or the second method are performed in both the first process and the second process; and the fourth reference data used in the second method in the second process is the same as the third reference data used in the first method in the first process.

* * * * *